(12) United States Patent
Esteban et al.

(10) Patent No.: US 7,354,103 B2
(45) Date of Patent: Apr. 8, 2008

(54) SUPPORT FRAME FOR AUTOMOBILE VEHICLE SUNROOFS

(75) Inventors: Diego Diez Esteban, Burgos (ES); Oscar Gonzalez Garcia, Soria (ES)

(73) Assignee: Grupo Antolin-Ingenieria, S.A., Burgos (ES)

( * ) Notice: Subject to any disclaimer, the term of this patent is extended or adjusted under 35 U.S.C. 154(b) by 0 days.

(21) Appl. No.: 10/541,541

(22) PCT Filed: Apr. 10, 2003

(86) PCT No.: PCT/ES03/00164

§ 371 (c)(1),
(2), (4) Date: Jul. 6, 2005

(87) PCT Pub. No.: WO2004/089670

PCT Pub. Date: Oct. 21, 2004

(65) Prior Publication Data

US 2006/0108838 A1 May 25, 2006

(51) Int. Cl.
*B60J 7/057* (2006.01)
(52) U.S. Cl. .................. 296/216.08; 296/223
(58) Field of Classification Search .......... 296/216.08, 296/223
See application file for complete search history.

(56) References Cited

U.S. PATENT DOCUMENTS

| | | | | | |
|---|---|---|---|---|---|
| 4,293,161 | A | * | 10/1981 | Lutz | 296/213 |
| 4,671,565 | A | * | 6/1987 | Grimm et al. | 296/216.04 |
| 5,527,086 | A | * | 6/1996 | Mori et al. | 296/223 |
| 6,830,291 | B2 | * | 12/2004 | Langguth | 296/216.08 |

FOREIGN PATENT DOCUMENTS

| | | |
|---|---|---|
| DE | 40 12 635 A | 10/1991 |
| DE | 94 17 148.3 | 2/1995 |
| DE | 196 41 462 A1 | 4/1998 |
| EP | 0 520 523 B1 | 12/1992 |
| ES | 2 045 974 | 1/1994 |
| FR | 2771970 * | 6/1999 |

* cited by examiner

*Primary Examiner*—Dennis H. Pedder
(74) *Attorney, Agent, or Firm*—Birch, Stewart, Kolasch & Birch, LLP

(57) ABSTRACT

Support frame for automobile vehicle sunroofs based on a single U-shaped element formed by longitudinal elements (2) and a front element (1). In these elements are provided the channels for the tow elements and for the tow elements excess, the drip rail and the associated guiding and control means for the slides which support the mobile panel.

12 Claims, 3 Drawing Sheets

Fig:2

SUPPORT FRAME FOR AUTOMOBILE VEHICLE SUNROOFS

The invention relates to a support frame for sunroofs, also termed window tops which are fitted in the roof of automobile vehicles and the specific function of which is to serve as structure and support, logically, of the sunroof assembly with its operating mechanisms, as well as incorporating the guidance system, water drainage elements, channels for the tow element, and the anchorages for its assembly on the bodywork.

In the measure of what is known, the cited functions of a support of this type are implemented at the present time by different pieces which are mounted in a single assembly which satisfies the aforesaid functions.

Thus, and within these known techniques, there exist among others, supports based on mixed aluminum and plastic structures which constitute two lateral guide rails, the great majority implemented by profiles in extruded aluminum, and a front crosspiece, generally of injected plastic, in which are incorporated the motor, a baffle, the guiding channels of the tow element, and the drip rails.

Other types of supports for sunroofs are also known which are configured from a single piece of aluminum, which is bent until the form of the structure is achieved, in which and subsequently the different pieces are installed just as in the previous case.

In both cases, and in addition to the components cited, these solutions incorporate a variable number of ancillary pieces, among which the most usual are:

Systems for water to run off made by plastic injection, usually two or four drip rails.

Tubes for guidance of the tow element excess.

Moveable element intended to cover internally the gap made in the roof trim. Said element is usually rigid like a moveable decoration or cover, or flexible like curtains.

Air baffle which acts in the cases of the moveable panel being open and which is hidden under the same in the remaining positions.

The drawbacks of these known supports rest fundamentally in the number of pieces and different materials which constitute the same as well as in the profusion of auxiliary items which have to be incorporated for the final concept of an acceptable support and, as a consequence thereof, the additional cost and risks produced by handling several different references as well as the assembly of all the components.

In contrast to these known techniques, the objective of the invention is a support frame for sunroofs which is implemented in a single piece, which implies a reduction in the number of references and the consequent reduction in the number of manufacturing stages, as well as in the time employed in the manufacture.

Another objective of the invention is a support frame for sunroofs which in the construction thereof uses only one material with a single manufacturing technology, normally injection of the fused material in a closed mould, like for example thermoplastic plastics or light alloys, which implies simplifying the manufacturing process, and simplifying later actions for the recycling thereof.

A further objective of the invention is a support frame for sunroofs which allows the process to be simplified and the manufacturing times to be shortened and the weight of the element to be reduced.

Yet another object of the invention is a support frame for sunroofs which allows the assembly in each lateral longitudinal element of a slide perfectly guided and controlled according to the X, Y and Z axes, and on which is mounted the moveable panel of the sunroof or window top.

Another final object of the invention is a support frame which is economical to manufacture and which can be put on the market at a lower cost than the usual article.

For the implementation of these objectives, the invention claims a support made in injected either plastic or light alloy material which is configured in a single piece structured in a U-shape, with the possibility of incorporating one or more crosspieces which give it rigidity and collaborate in maintaining the spacing between the two longitudinal elements and the front element which constitute it.

On the two longitudinal elements, other elements are made integrated therein among which are the following:

A.—Points for anchoring to the bodywork of the vehicle, in the number and size that are necessary.

B.—Support and guiding channels for the tow element which carries the slide and for the tow element excess determined by the position of the slide.

The channel for guidance of the element driving the slide has to be prepared not only to carry the tow element, but also to guide and hold the slide itself, while the channels for the tow element excess, would be conceived solely to guide the excess part of the aforementioned tow element.

The guiding channel for the tow element is conceived in the body of the frame based on a number of lower semi-cylindrical forms which emerge convexly downwards, in alignment and alternating with others above with the opposite orientation to the preceding ones, so that between the two said guiding channel is defined with tubular form.

In the areas of the guiding channel in which the pulling slide runs, the upper semi-cylindrical forms are open, comprising an angle of 90 degrees.

Another alternative for the embodiment of the channel of the tow element in the area through which the slides run, consists of a downwardly convex lower semi-cylindrical continuous channel and upwardly convex confronting upper arches in discontinuous arrangement, left and right, which do not meet each other, and leave a free space at the top. So that these arches can be fabricated by injection, there are gaps in the lower semi-cylinder and the horizontal projection of said gaps coincides with the horizontal projection of the aforementioned arches.

This configuration offers in its transverse section an open circular gap, through which opening the necessary passage is facilitated for the support elements of the slide for the guided carriage and holding of the same inside the gap, so that it cannot be displaced in any direction contained in the plane perpendicular to the direction of displacement of the slide.

The guide for the tow element excess, which need not carry more than the tow element itself, is implemented in a similar manner, with separate and alternating semi-cylindrical portions, some downwardly convex and others upwardly convex, so that they follow each alternately, constituting thereby a tubular guiding channel. The upper upwardly convex portions are positioned in the gaps which are created between the downwardly convex lower portions.

C.—External and lateral guides running the length of the longitudinal elements for the carriage, guidance and holding of the slide which is moved by the action of the tow element, are those which will opportunely be clasped by a projecting portion of the slide, the contribution of which is to prevent undesired displacements of the slide according to the Z axis.

D.—Another pair of also external and lateral guides, for the guidance of the moveable trim or curtains of the sunroof, below the set previously mentioned.

E.—A support, underneath this last guide for receiving a joint of roof trim and support.

F.—A free area to allow the passing of the slides, which has a bottom for the passing of the lower portion of the slide on which the tow element acts. Said passage is determined by the gap offered by the semi-cylindrical projections and the quarter-cylinder projections mentioned above, concerning which more will be explained later.

This area for the passing of the slide, comes with two lateral walls on which ride two lateral surfaces of the slide, controlling said slide in its possible displacements according to the Y axis, perpendicular to the displacement of the slide in the horizontal plane.

G.—Lateral drip rail for drainage of the water which may come to penetrate between the moveable panel and the rest of the roof of the bodywork.

The front part of the support of the invention, incorporates in turn the following elements:

H.—Points for anchorage of the assembly on the bodywork.

I.—Channels for the tow element and for the tow element excess, which in this case would be the same, based on semi-cylindrical portions identical to those previously mentioned for the sides, since they would not require the passage of the slide. These channels of the front part are already contemplated in the previous techniques, being therefore known.

J.—Area of anchorage of the joint of the roof trim and support.

K.—Front drip rail which allows, in the event, the housing of a baffle.

L.—An area for the anchorage of the motor driving the system for opening the window top.

With regard to the slide, the invention envisages the embodiment of two lateral walls, which abut on two others corresponding of the longitudinal elements, which have already been referred to.

The slide also incorporates a lateral projection bent back on itself, which is inserted in the corresponding guide made in the longitudinal elements, regarding which mention was made previously.

The support assembly can incorporate transverse reinforcements in its lower face and along its geometry to give greater rigidity to the support if necessary, in which case they would be an integral part of the support itself.

The drip rail of the support will converge, preferentially, in at least one outlet for drainage of the incoming water through known means.

The assembly of the invention is represented in the accompanying sheets of drawings, in which the following is described in a non-restrictive manner:

Figure 1:
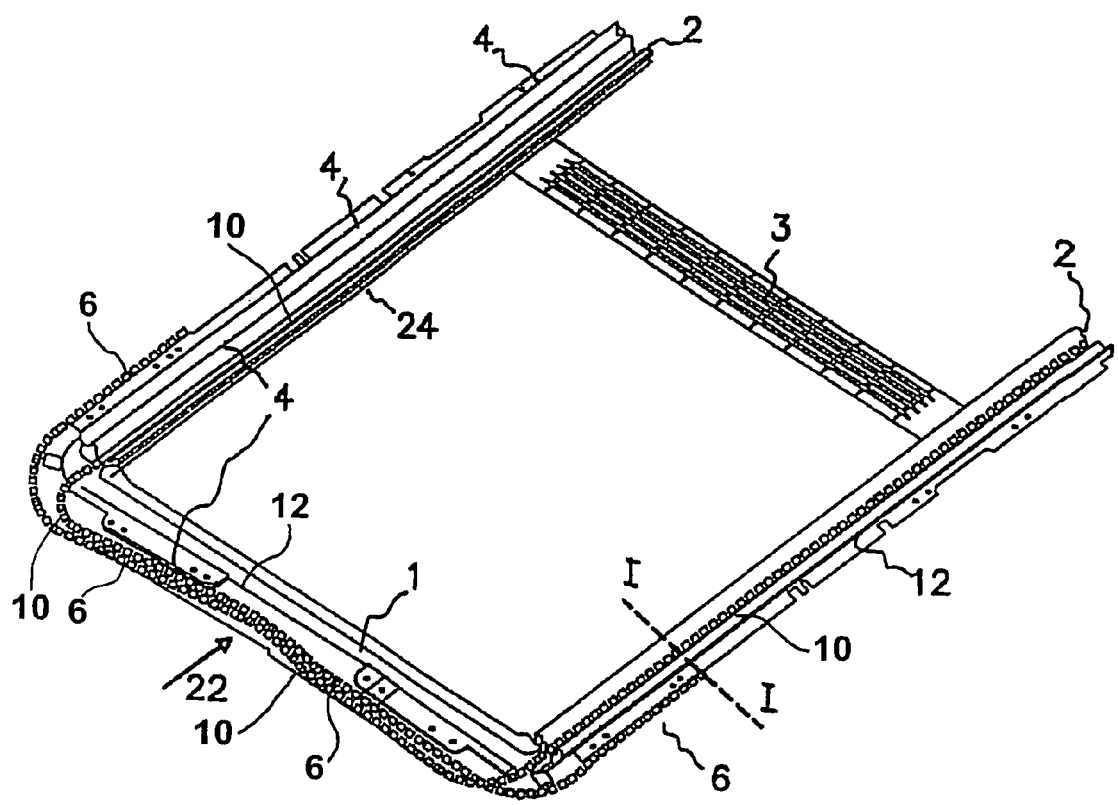
FIG. 1, is a perspective of the support object of the invention.
Figure 3:
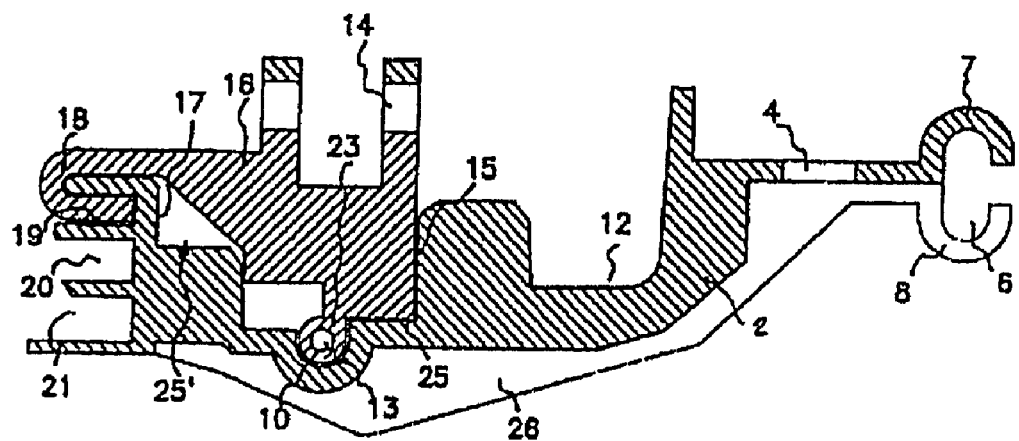

FIG. 3, consists of the section on the plane I-I, made in FIG. 1, incorporating the slide not represented therein.

Figure 4:
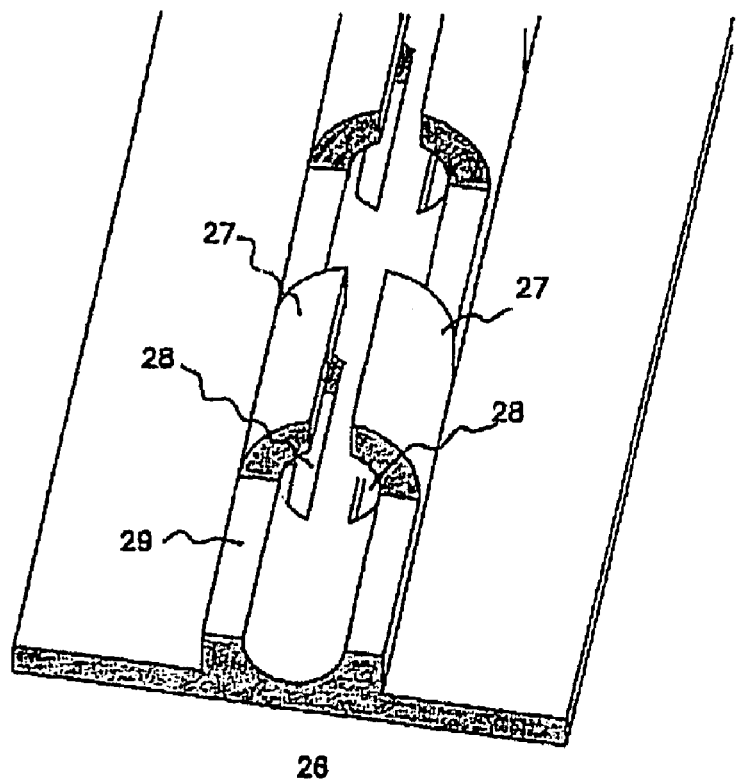

FIG. 4, is a detail of another possible geometry for the channel of the tow element for the areas through which the pulling slide runs.

With regard to FIG. 1, the U-shaped support is pointed out, with its two longitudinal elements (2) and a front element (1), together with a reinforcing crosspiece (3), constituting a single unit.

In the longitudinal elements (2) anchorages (4), channels (10) for a tow element, and a slide are appreciated, as well as channels (6) for the tow element excess in the event, and the drip rail (12). The inner longitudinal side (24) is that which includes the guides for the slide and for the guidance of the moveable panel, as well as the housing for the joint.

In the front part (1) the channels (10 and 6) are also appreciated for the tow element and tow element excess similar to those corresponding in the longitudinal elements, the drip rail (12) and the area prepared for the seating (22) of the motor.

Figure 2:
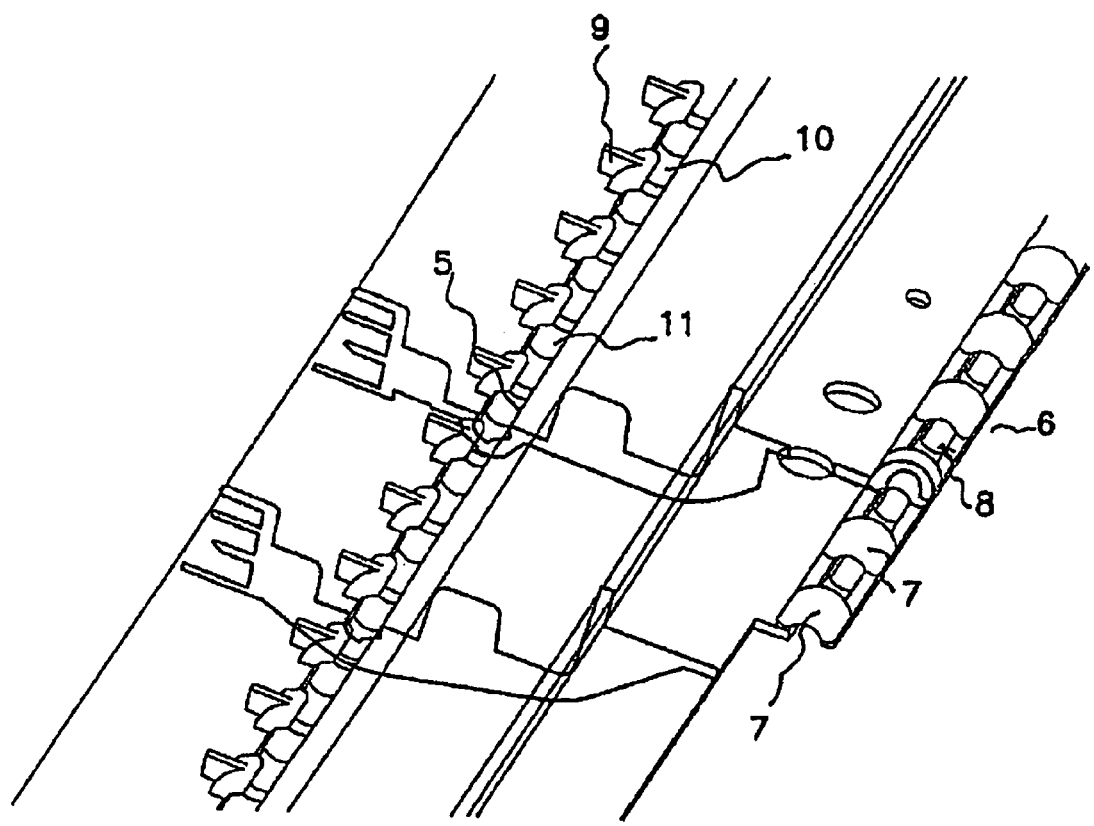
FIG. 2, is an enlarged detail in perspective of the upper face of the longitudinal elements of the support, according to the invention.

In FIG. 2, the specific geometry is observed of the tow element channels (10) and of the tow element excess channel. The alternate combination can thus be appreciated of the semi-cylindrical areas (5), downwardly convex, separated regularly by gaps (11), and in opposition cylindrical upwardly convex areas (9) which cover an angle of 90 degrees and are upwardly convex, being located above the gaps (11).

This combination configures a circular interior gap having open spaces which offer the 90 degree segments, making possible the passage of the tow element and reception and guidance of the corresponding end of the slide, which end is linked with the circular slide itself through the opening of the areas with respect to the body of the support.

On the other hand, the channel (6) for the tow element, when it does not include the slide is defined by upper (7) and lower (8) cylindrical areas displaced one with respect to the others and opposite to configure a circular gap.

In this same FIG. 3, the seat area (25, 25') for the slide is pointed out, above the mounting of the guiding channel of the tow element (10). The elements are observed for the anchorages (4) as well as the drainage surfaces.

On the lower part of the slide (16), the links (23) of the same are appreciated with the cylindrical end (13) which will be lodged in the channel (10). On this end (13), the tow element is connected for transmission of the force moving the slide, and the links (23) can run freely thanks to the openings availed by the cylindrical upwardly convex areas (9) of the longitudinal elements.

The slide (16) shows a flange bent back on itself (18) whose end is inserted in a recess (19) for guidance in the longitudinal elements, a recess (20) for guidance, being represented underneath, for the moveable panel or curtains and a third recess (21) for securing of a joint which finishes edges of a trim and of a window top.

Adjacent to the position of the slide (16) and to the left according to this FIG. 3, the drip rail (12) is seen and the surface area for the various anchorages (4), which gives passage to the guiding channel (6) of the tow element excess, defined by the two semi-cylindrical areas (7, 8), alternate and in opposite position.

Below this area, an example is also observed of one of the previously mentioned transverse ribs (26) for reinforcement.

The drip rail (12) extends toward the front part (1) of the support as do the guides for the tow element.

From FIG. 4 the specific geometry of the tow element channels is observed, with the downwardly convex lower semi-cylinder (29), the opposite arches (27), upwardly convex which define the upper face of the channel of the tow element, and the gaps (28) of the lower semi-cylinder (29) which allow the injection of the upper arches (27).

The invention claimed is:

1. Support frame for automobile vehicle sunroofs, comprising a front element (1) longitudinal elements (2) and a reinforcing crosspiece (3) constituting all together a single piece, in which a slide (16) runs along each of the two longitudinal elements, said slide being pulled by a tow element, and which is characterized in that:

the support frame is a single piece implemented by injection of fused material in closed mould, which material can be one of a thermoplastic, a light alloy, and any other structural material capable of being conformed with this procedure, U-shaped, consisting of said front element (1), and two said longitudinal elements (2) with said reinforcing crosspiece;

a channel (10) for guiding the tow element, which carries the slide (16) and for the sliding of links (23) with the tow element in the slide, which is carried out along the two longitudinal elements (2) of the support frame, and wherein the channel comprises aligned downwardly convex semi-cylindrical areas regularly separated by gaps and in opposition cylindrical areas upwardly convex placed in discontinuous arrangement and located above the gaps (11);

an area above the channel (10) wherein the slide (16) is seated, which has predominantly vertical walls (15, 17) which laterally control possible displacements of said slide in the horizontal plane.

2. Support frame for automobile vehicle sunroofs, according to claim 1, characterized in that the opposing cylindrical upwardly convex areas (9) are in quarter cylinder form which are located above gaps (11) and are convex toward the upper face, and together with the downwardly convex semi-cylindrical areas constitute a tubular housing with a longitudinally open window through which can run the links (23) of the slide with its lower end (13) secured to the driving element, the tow element.

3. Support frame for automobile vehicle sunroofs, according to claim 1, characterized in that the cylindrical upwardly convex areas are opposite arches (9), and the aligned downwardly convex semi-cylindrical areas regularly are separated by gaps (11).

4. Support frame for automobile vehicle sunroofs, according to claim 1, characterized in that in each longitudinal element, three longitudinal recesses are defined, one recess for guidance (19) to receive a flange bent back on itself (18) of the slide 16, another recess (20) for the guidance of the moveable panel and a third (21) for the securing of a joint which finishes the edges of a trim and of a window top.

5. Support frame for automobile vehicle sunroofs, according to claim 1, characterized in that each longitudinal element consists of another pair of channels for guiding the tow element excess (6), and which are constituted by two rows of alternating projections of semi-cylindrical section (7, 8) with free spaces and confronting each other in the free spaces.

6. Support frame for automobile vehicle sunroofs, according to claim 1, characterized in that it comprises a drip rail (12) made in each longitudinal element (2) in longitudinal form.

7. Support frame for automobile vehicle sunroofs, according to claim 1, characterized in that the anchorage points and supports on the bodywork of the vehicle are integrated in the same body.

8. Support frame for automobile vehicle sunroofs, according to claim 1, characterized in that the front element (1) of the frame also includes the drip rail (12) connected to that of the longitudinal elements and to the means used to drain the water.

9. Support frame for automobile vehicle sunroofs, according to claim 1, characterized in that in the front element (1) of the frame, channels are incorporated to guide the tow element implemented as a continuation of those of the longitudinal elements, as well as various anchorage areas and supports, and an area (22) for mounting a motor.

10. Support frame for automobile vehicle sunroofs, according to claim 4, characterized in that it consists of another pair of channels (6) for guiding the tow element excess, and which are constituted by two rows of alternating projections of semi-cylindrical section (7, 8) with free spaces and confronting each other in the free spaces.

11. Support frame for automobile vehicle sunroofs, according to claim 4, characterized in that the front element (1) of the frame also includes a drip rail (12) connected to that of the lateral longitudinal elements and to the means used to drain the water.

12. A support frame for automobile vehicle sunroofs, comprising:

a front element (1);

a reinforcing crosspiece (3);

two longitudinal elements (2), wherein a slide (16) runs along each of the two longitudinal elements, said slide being pulled by a tow element;

a plurality of downwardly convex semi-cylindrical protrusions aligned downwardly and separated by gaps;

a plurality of upwardly convex cylindrical protrusions placed in discontinuous arrangement and located such that they protrude over said gaps, the plurality of downwardly and upwardly convex protrusion forming a channel (10) for guiding the tow element, which carries the slide (16) and for the sliding of a link (23) with the tow element during an actual slide, which is carried out along the two longitudinal elements (2) of the support frame; and an area above the channel (10) wherein the pulled slide (16) is seated, which has predominantly vertical walls (15, 17) which laterally control possible displacements of said slide in the horizontal plane; and wherein the support frame is a single U-shaped piece implemented by injection of fused material in a closed mould.

* * * * *